United States Patent
Yu et al.

(10) Patent No.: US 7,480,325 B1
(45) Date of Patent: *Jan. 20, 2009

(54) SIGNAL RECEIVER FOR INTEGRATING AND COMBINING INTEGRATIONS IN ALTERNATING TIME SEGMENTS FOR SIGNAL ACQUISITION AT LOW SIGNAL STRENGTH

(75) Inventors: Yiming Yu, Cupertino, CA (US); Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 558 days.

This patent is subject to a terminal disclaimer.

(21) Appl. No.: 11/059,182

(22) Filed: Feb. 16, 2005

Related U.S. Application Data

(63) Continuation of application No. 09/893,179, filed on Jun. 27, 2001, now Pat. No. 6,898,234.

(51) Int. Cl.
*H04B 1/00* (2006.01)
(52) U.S. Cl. .................. 375/149; 375/150; 375/142; 375/343; 375/367
(58) Field of Classification Search ............. 375/149, 375/150, 142, 343, 367
See application file for complete search history.

(56) References Cited

U.S. PATENT DOCUMENTS

| | | | |
|---|---|---|---|
| 5,577,025 A | 11/1996 | Skinner et al. | |
| 5,852,630 A * | 12/1998 | Langberg et al. | 375/219 |
| 6,047,017 A | 4/2000 | Cahn et al. | |
| 6,160,841 A * | 12/2000 | Stansell et al. | 375/148 |
| 6,317,452 B1 | 11/2001 | Durrant et al. | |
| 6,606,346 B2 * | 8/2003 | Abraham et al. | 375/142 |
| 6,650,689 B1 * | 11/2003 | Oishi et al. | 375/142 |
| 6,735,243 B1 * | 5/2004 | Akopian | 375/150 |
| 6,795,771 B2 * | 9/2004 | Fuchs et al. | 701/213 |
| 6,888,879 B1 | 5/2005 | Lennen | |
| 2001/0009563 A1 | 7/2001 | Kohli et al. | |
| 2005/0276316 A1 | 12/2005 | Rabaeijs et al. | |

\* cited by examiner

*Primary Examiner*—Shuwang Liu
*Assistant Examiner*—Kabir A Timory

(57) ABSTRACT

A GPS receiver for integrating a GPS signal separately in a series of "A" type and "B" type time segments, the "A" segments alternating with the "B" time segments; combining the squares of the magnitudes of "A" time segment integrations corresponding to code phases for forming "A" type combined magnitudes; combining the squares of the magnitudes of the "B" time segment integrations corresponding to code phases for forming "B" type combined magnitudes; and determining an acquisition code phase of the signal from the strongest of the "A" or "B" combined magnitudes. The "A" time segments and the "B" time segments are one-half the period of the data bits of the signal, thereby ensuring that either the "A" time segments or the "B" time segments avoid the nullifying effect of data bit inversions.

14 Claims, 4 Drawing Sheets

SIGNAL RECEIVER FOR INTEGRATING AND COMBINING INTEGRATIONS IN ALTERNATING TIME SEGMENTS FOR SIGNAL ACQUISITION AT LOW SIGNAL STRENGTH

CROSS REFERENCE TO PRIOR APPLICATION

This application is a continuation of prior application Ser. No. 09/893,179 filed Jun. 27, 2001 now U.S. Pat. No. 6,898, 234, by the same inventors obligated to assign to the same assignee.

BACKGROUND OF THE INVENTION

1. Field of the Invention

The invention relates generally to global positioning system (GPS) receivers and more particularly for a GPS receiver for acquiring a GPS signal by integrating "A" time segments separately and then combining the "A" segment integrations, and integrating "B" time segments separately and then combining the "B" segment integrations where the "A" time segments and the "B" time segments alternate.

2. Description of the Prior Art

The global positioning system (GPS) is a system using GPS satellites for broadcasting GPS signals having information for determining location and time. Each GPS satellite broadcasts a GPS signal having 20 milliseconds (ms) GPS data bits of modulated by a 1 ms pseudorandom noise (PRN) code having 1023 bits or chips. The PRN code for each GPS satellite is distinct, thereby enabling a GPS receiver to distinguish the GPS signal from one GPS satellite from the GPS signal from another GPS satellite. The 20 ms GPS data bits are organized into frames of fifteen hundred bits. Each frame is subdivided into five subframes of three hundred bits each.

Typically, when the GPS receiver is first turned on, it knows its own approximate location, an approximate clock time, and almanac or ephemeris information for the locations-in-space of the GPS satellites as a function of clock time. The GPS receiver processes the approximate time, its approximate location, and the almanac or ephemeris information to determine which of the GPS satellites should be in-view and generates one or more GPS replica signals having carrier frequencies and pseudorandom noise (PRN) codes matching the estimated Doppler-shifted frequencies and the PRN codes of one or more of the in-view GPS satellites. The GPS receiver correlates the carrier frequency, the PRN code, and a PRN code phase of the incoming GPS signal to the replica signals and then accumulates a correlation level. The process of correlation and accumulation may need to be repeated many times until a correlation level is found that exceeds a correlation threshold indicating GPS signal acquisition at the frequency, PRN code, and code phase of the replica signals.

The incoming GPS signal has a low signal-to-noise ratio because of the spreading effect of the PRN code. The effect of the correlation and accumulation process for despreading the spread GPS signal is to increase the signal-to-noise ratio in order to be able to recognize the GPS data bits. This increase in signal-to-noise ratio that results from the despreading is termed processing gain. Additional processing gain can sometimes be achieved by correlating and accumulating several epochs of the PRN code.

When signal acquisition is achieved the GPS receiver monitors the GPS data bits until a hand over word (HOW) at the start of the subframe is recognized. The GPS receiver reads time of week (TOW) in the GPS data bits in the HOW to learn a GPS-based clock time. A current precise location-in-space of the GPS satellite is then calculated from the GPS-based clock time and the ephemeris information. The code phase of the GPS replica signal is then used to calculate a pseudorange between the location of the GPS receiver and the location-in-space of the GPS satellite. Typically, the ephemeris information is retained in memory in the GPS receiver from a previous operational mode or is determined by reading additional GPS data bits. The geographical location fix is derived by linearizing the pseudorange about the range between the location-in-space of the GPS satellite and the approximate location of the GPS receiver and then solving four or more simultaneous equations having the locations-in-space and the linearized pseudoranges for four or more GPS satellites.

The global positioning system is commonly used for determining geographical location and/or time in commercial applications including navigation, timing, mapping, surveying, machine and agricultural control, vehicle tracking, and marking locations and time of events. Given such wide commercial application, it is clear that GPS receivers provide a good value for many users. However, the global positioning system has been limited in several potential applications because existing GPS receivers are unable to acquire a GPS signal unless the GPS signal has a relatively clear line of sight to the GPS satellites ensuring strong GPS signals. Typically, this is not a problem where the GPS receiver is mounted on a platform such as a ship, airplane, farm tractor, or a vehicle traveling on an open highway. However, the signal strength requirements of GPS receivers make it difficult to use GPS indoors or where the GPS signal may be weak due to the attenuation of passing through buildings or trees.

In order to increase the strength and signal-to-noise ratio of the GPS signal within the GPS receiver, workers in the art use techniques for increasing the processing gain above the standard processing gain that occurs by despreading a single epoch of the 1 ms PRN code. For example, a theoretical additional processing gain for integrating (correlating and accumulating) ten coherent epochs is $10 \log_{10} 10 = 10$ decibels (dB) and the increased processing gain for one-hundred coherent epochs is $10 \log_{10} 100 = 20$ decibels (dB). It would seem that one could increase the number of despread epochs indefinitely until enough processing gain is achieved for overcoming the GPS signal attenuation caused by buildings and trees. Unfortunately, every 20 ms the C/A PRN code may be inverted with a new GPS data bit, thereby nullifying the processing gain for integration times beyond 20 ms. Accordingly, there continues to be a need for improvements in GPS receivers and methods for acquisition of weak GPS signals.

SUMMARY OF THE INVENTION

Briefly, an object of the present invention is to increase processing gain for acquisition of a weak spread spectrum signal by organizing time into "A" type time segments and "B" type time segments that alternate with the "A" type time segments; then integrating the signal separately in each of the time segments, whether "A" time segment or "B" time segment; and then combining squares of magnitudes of the "A" segment integrations corresponding to code phases for forming "A" combined magnitudes and combining squares of magnitudes of the "B" segment integrations corresponding to code phases for forming "B" combined magnitudes. A code phase that results in the strongest of the combined magnitudes is used for signal acquisition. Using time segments of one-half the period of the data bits of the signal ensures that either the "A" time segments or the "B" time segments avoid the nullifying effect of data bit inversions. In order to more easily follow the summaries of embodiments, the reader may want to refer to FIGS. 3 and 4.

In a preferred embodiment for a global positioning system (GPS) incoming signal having 20 millisecond (ms) data bits, a signal reception time period is segmented into 10 ms "A" time segments and 10 ms "B" time segments where the "A" time segments and the "B" time segments alternate. The GPS signal in each of the "A" time segments is integrated coherently within the period of the time segment for providing "A" segment magnitude sets. Each of the "A" segment magnitude sets includes "A" segment magnitudes for code phases, respectively, of a spreading code of the GPS signal. The "A" segment magnitudes for the code phases, respectively, are combined non-coherently for providing respective "A" combined magnitudes. Likewise, the GPS signal in the "B" time segments is processed for determining "B" combined magnitudes for the code phases, respectively. The strongest of the "A" or "B" combined magnitudes or the strongest of a combination of the "A" and "B" combined magnitudes is compared to a correlation threshold. When the threshold is exceeded, the GPS code phase that yielded the strongest combined magnitude is used for GPS signal acquisition.

A benefit of the present invention is that a large signal processing gain is achieved due to the length of time of the time segments and the number of segment magnitudes that are combined, thereby improving the probability of rapid acquisition of a weak signal.

These and other objects and benefits of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
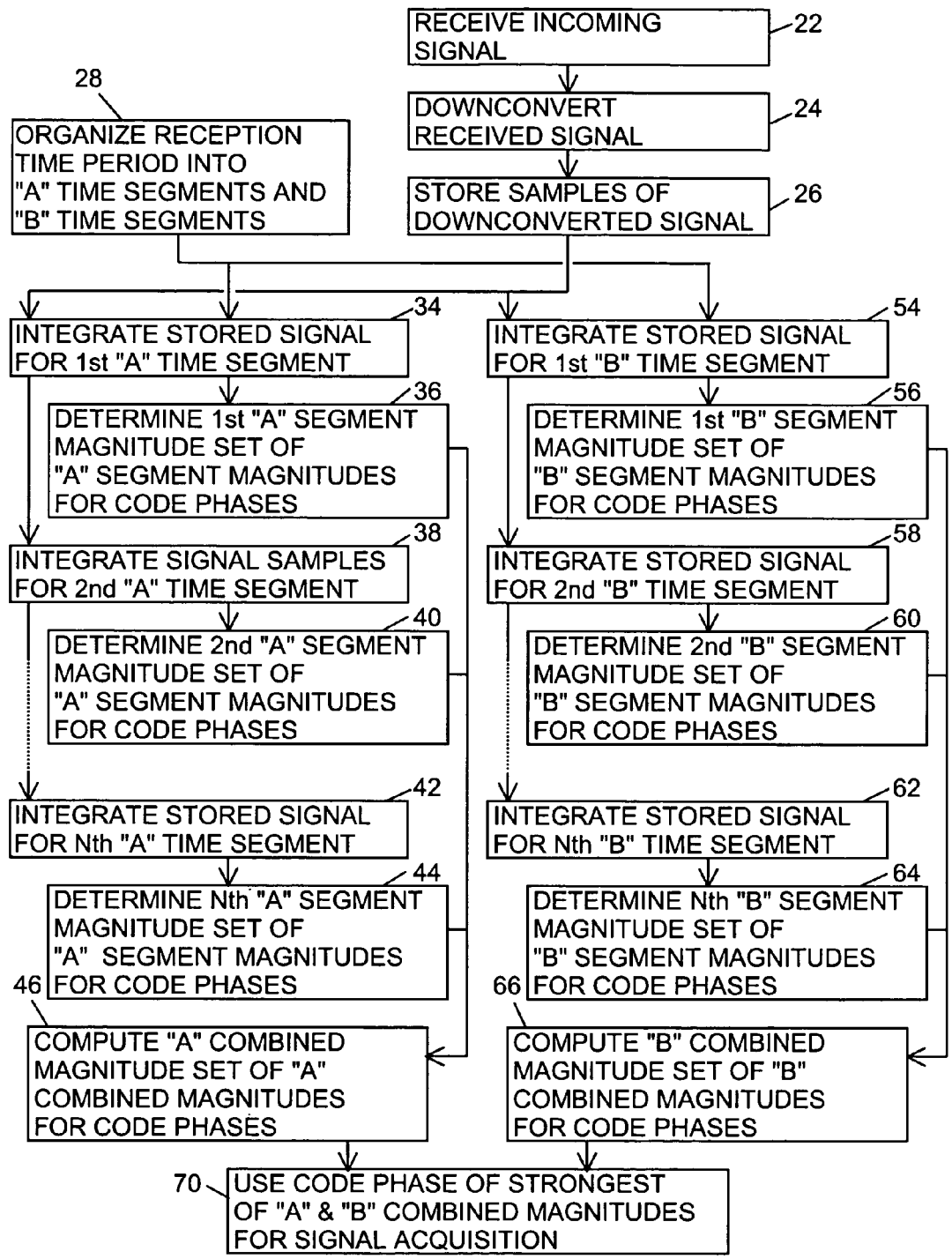
FIG. 1 is a flow chart of a method of the present invention for acquisition of an incoming spread spectrum signal.
Figure 3:
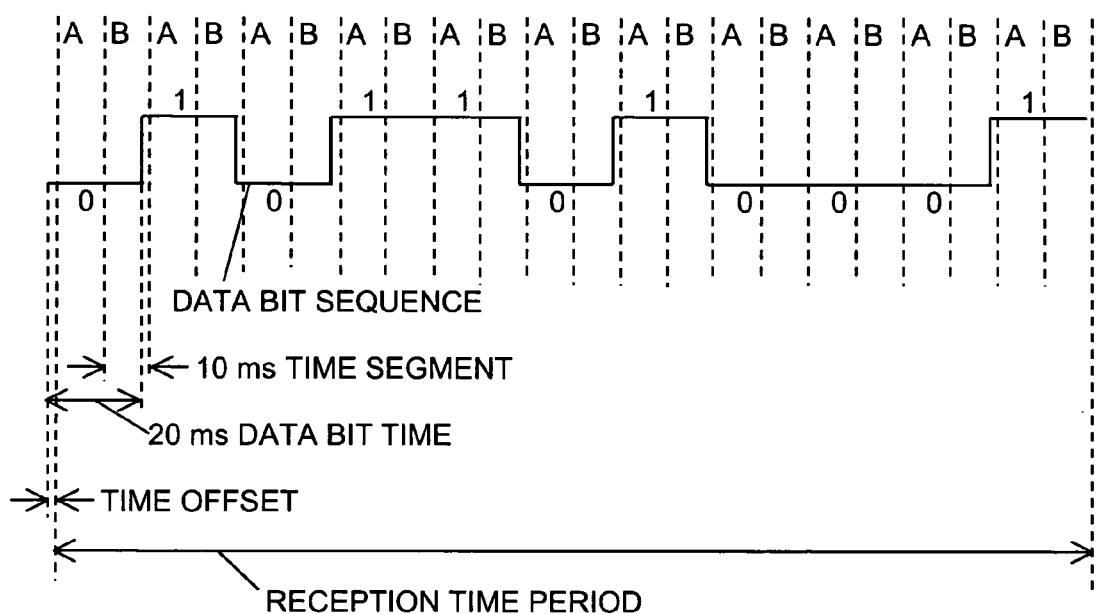
FIG. 3 is a time chart for the present invention of FIGS. 1-2 showing alternating "A" and "B" time segments for a reception time period.

The FIG. 1 is a flow chart of a method of the present invention for fast acquisition of weak GPS signals. In a step 22 the incoming GPS signal is received for a reception time period. In a step 24 the GPS signal is downconverted. In a step 26 the downconverted GPS signal is sampled and a representation of the GPS signal for the reception time period is stored. In a step 28 the reception time period associated with the stored signal representation is organized into alternating "A" time segments and "B" time segments as shown in FIG. 3 and described in the accompanying detailed description below. Preferably, the lengths of the time segments are one-half the time periods of the data bits of the incoming signal. For the 20 milliseconds (ms) data bits of the GPS signal, the time segments are 10 ms.

For each time segment, the stored signal representation is integrated for providing a set of "A" segment magnitudes and a set of "B" segment magnitudes for each potential incremental code phase of a pseudorandom noise (PRN) spreading code of the GPS signal. Accordingly, in a step 34 the stored signal representation is integrated for a first "A" time segment for determining a set of first "A" integration levels for incremental code phases, respectively, of the GPS spreading code. In a step 36 first "A" segment magnitudes are determined from the magnitudes of the first "A" integration levels, respectively. The first "A" segment magnitudes make up a first "A" segment magnitude set. In a step 38 the stored signal representation is integrated for a second "A" time segment for determining second "A" integration levels, for the incremental code phases, respectively. In a step 40 second "A" segment magnitudes are determined from the magnitudes of the second "A" integration levels, respectively. The second "A" segment magnitudes make up a second "A" segment magnitude set. This process of integrating and determining magnitudes continues for all the "A" time segments until the last "A" time segment referred to as the Nth "A" time segment. Then, in a step 42 the stored signal representation is integrated for an Nth "A" time segment for determining Nth "A" integration levels for the incremental code phases, respectively. In a step 44, Nth "A" segment magnitudes are determined from the magnitudes of the Nth "A" integration levels, respectively. The Nth "A" segment magnitudes make up an Nth "A" segment magnitude set.

Figure 4:
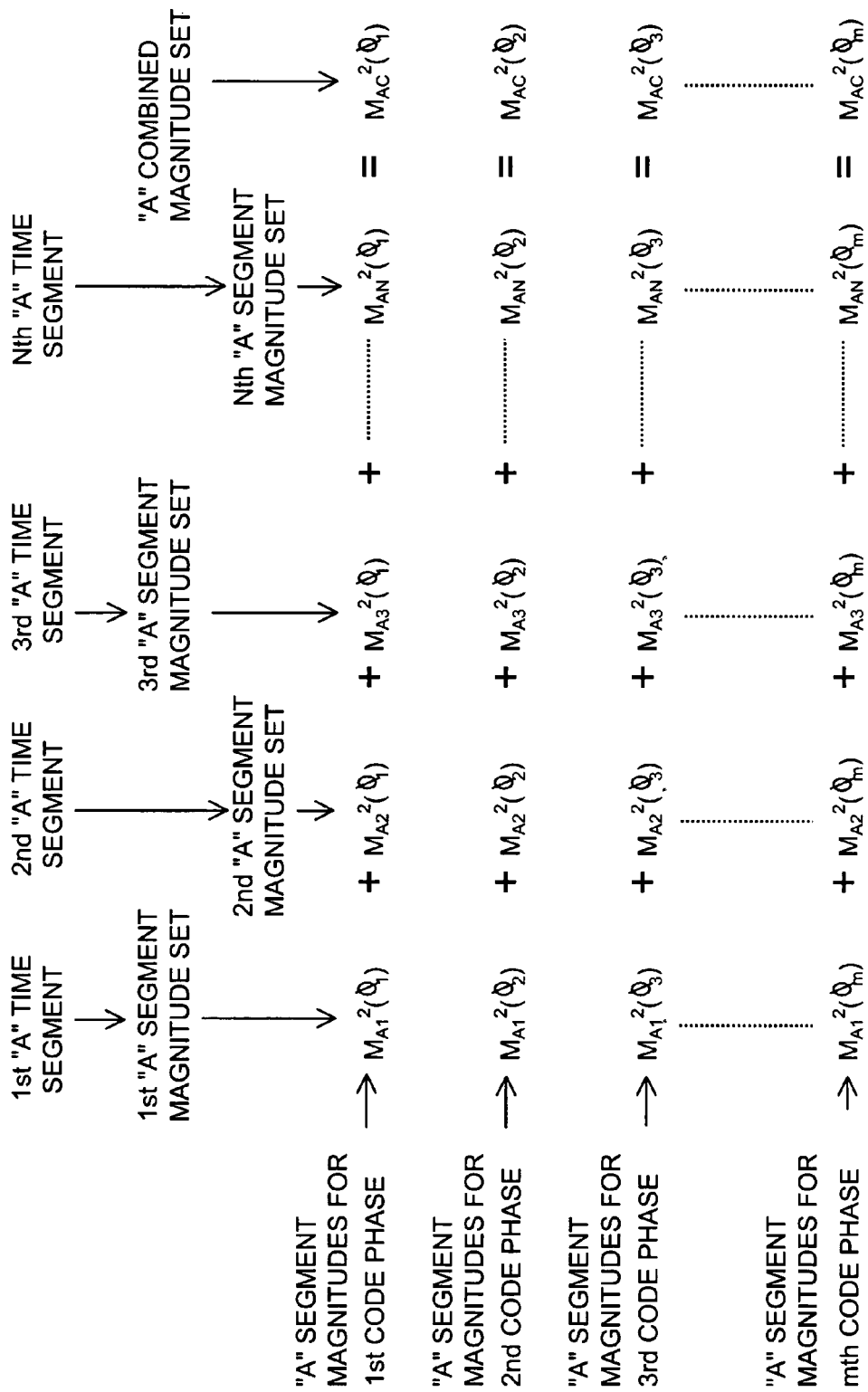
FIG. 4 is a chart illustrating a manner of combining magnitudes for determining a code phase for the acquisition of an incoming spread spectrum signal in the present invention of FIGS. 1-2.

For each incremental code phase, in a step 46 the "A" segment magnitudes of the first through Nth "A" segment magnitude sets are combined incoherently according to code phase for providing an "A" combined magnitude set of "A" combined magnitudes. The "A" combined magnitudes correspond to code phases, respectively. Stated in another way, assume there are M potential code phase increments. The first through Nth "A" segment magnitudes for the first code phase are combined incoherently for providing the first "A" combined magnitude, the first through Nth "A" segment magnitudes for the second code phase are combined incoherently for providing the second "A" combined magnitude, and so on until the first through Nth "A" segment magnitudes for the Mth code phase are combined incoherently for providing the Mth "A" combined magnitude. The way in which the "A" segment magnitude sets are combined is illustrated in FIG. 4 and described in greater detail in the accompanying detailed description.

In a preferred embodiment, increments of code phase are one-half chip or slightly less than one-half chip of the spreading code. For a spreading code having 1023 chips, there are preferably 2048 "AA" segment magnitudes in each "A" segment magnitude set and therefore there are 2048 "A" combined magnitudes in the "A" combined magnitude set. Of course other, code phase increments can be used for providing other numbers of "A" segment magnitudes and "A" combined magnitudes making up the respective sets.

Similarly, in a step 54 the stored signal representation is integrated for a first "B" time segment for determining first "B" integration levels for incremental code phases, respectively, of the GPS spreading code. In a step 56 first "B" segment magnitudes are determined from the magnitudes of the first "B" integration levels, respectively. The first "B" segment magnitudes make up a first "B" segment magnitude set. In a step 58 the stored signal representation is integrated for a second "B" time segment for determining second "B" integration levels for incremental code phases, respectively. In a step 60 second "B" segment magnitudes are determined from the magnitudes of the second "B" integration levels, respectively. The second "B" segment magnitudes make up a second "B" segment magnitude set. This process of integrating and determining magnitudes continues for all the "B" time segments until the last "B" time segment referred to as the Nth "B" time segment. Then, in a step 62 the stored signal representation is integrated for an Nth "B" time segment for determining Nth "B" integration levels for incremental code phases, respectively. In a step 64, Nth "B" segment magnitudes are determined from the magnitudes of the Nth "B" integration levels, respectively. The Nth "B" segment magnitudes make up an Nth "B" segment magnitude set. In a step 66 for each incremental code phase, all the "B" segment magnitudes are combined incoherently for providing a "B" combined magnitude for that code phase. For an exemplary case of 1023 code phases (chips) for the spreading code, there are preferably 2048 "B" combined magnitudes in the "B" combined magnitude set corresponding to 2048 "B" segment magnitudes in each "B" segment magnitude. FIG. 4 and the accompany detailed description further illustrate the manner of combining the "B" segment magnitude sets.

Then, in a step 70 the code phase increment that results in the strongest of the "A" combined magnitudes, the "B" combined magnitudes, or combination of the "A" and "B" combined magnitudes for the same code phase increment is determined. When the strongest combined magnitude exceeds a correlation threshold, the code phase increment associated with that combined magnitude is then used for signal acquisition of the incoming signal. When the strongest of the combined magnitudes does not exceed the required correlation threshold, then a different Doppler frequency, a different PRN code, a different GPS time, or the like is tried and the process is repeated; or a standby mode may be induced in order to conserve power.

It is understood by those skilled in the art that the GPS signal for each time segment can be integrated in one or several stages. Where several stages are used, the integrations for the stages are accumulated coherently for length of time of the time segment. For example, the signal can be integrated for a 10 millisecond time period. Or, the signal can be integrated and for 10 one millisecond time periods and then the 10 integrations can be accumulated coherently by adding them together. Typically for the existing art, a coarse/acquisition (C/A) GPS signal is integrated over a time period of a single complete epoch of 1 millisecond (ms). For the present invention, the incoming signal can be integrated in one or more stages for the time period of the time segment.

Figure 2:
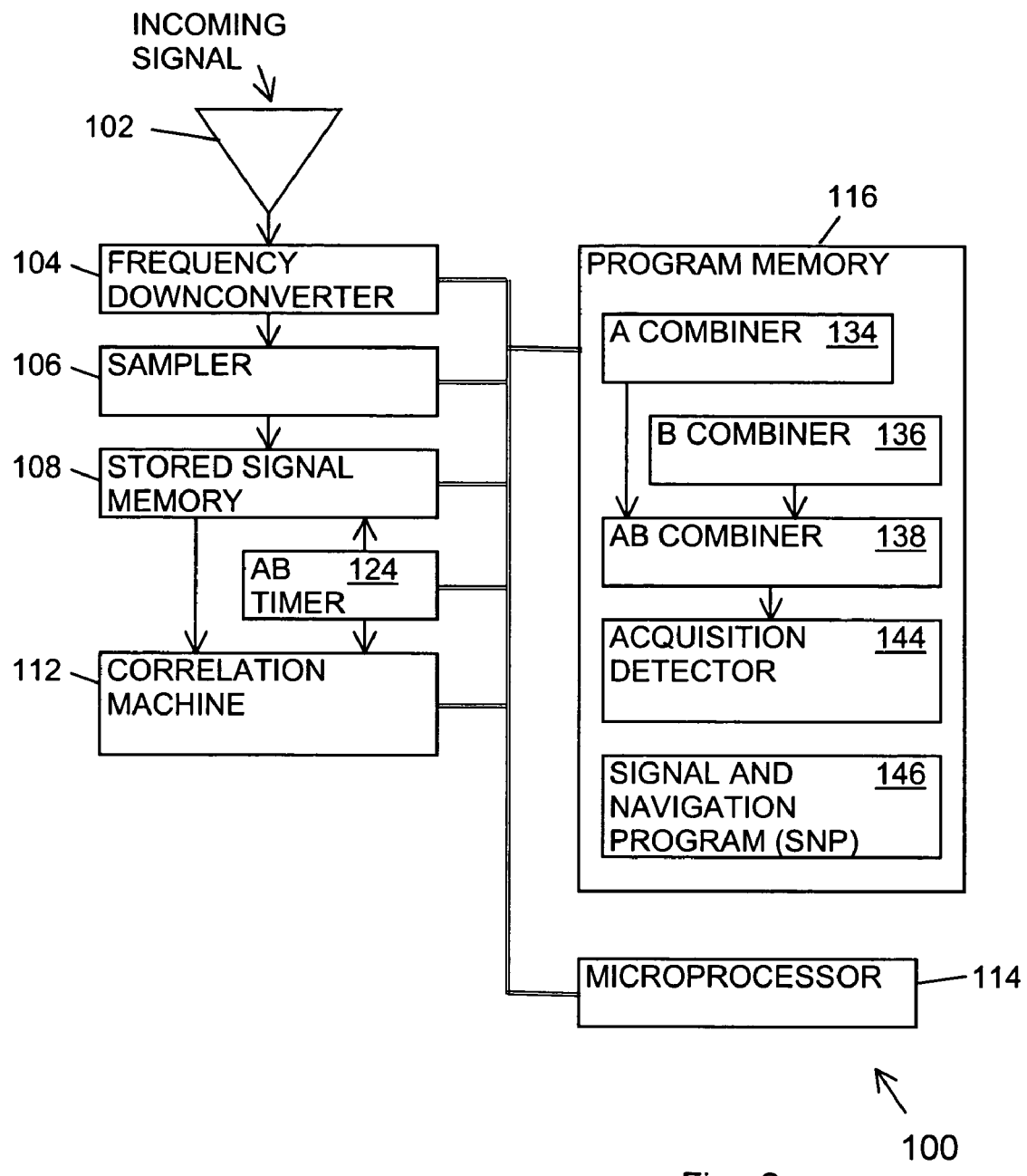
FIG. 2 is a block diagram of a GPS receiver using the method of FIG. 1.

FIG. 2 is a block diagram of a signal receiver of the present invention referred to by the general reference number 100. The receiver 100 is described in terms of a global positioning system (GPS) receiver for receiving incoming coarse/acquisition (C/A) GPS signals. However, those of ordinary skill in the art of spread spectrum radio receivers will see that the block diagram illustrated in FIG. 2 and described below can be applied for receiving other types of signals, especially for receiving other types of direct fast sequence spread spectrum signals including but not limited to certain code division multiple access (CDMA) signals and precision P or P(Y) code GPS signals.

The GPS receiver 100 includes a GPS antenna 102, a frequency downconverter 104, a sampler 106, a stored signal memory 108, a correlation machine 112, a microprocessor 114, and a program memory 116. The GPS antenna 102 converts incoming airwave GPS signals from GPS satellites or pseudolites to conducted GPS signals and passes the conducted GPS signals to the frequency downconverter 104. The frequency downconverter 104 includes mixers and local oscillators for downconverting the GPS signals to a lower frequency and passing the lower frequency GPS signals to the sampler 106. The sampler 106 samples the downconverted GPS signals at a rate of twice or more the chipping rate of the spreading code of the GPS signals for providing in-phase (I) and quadrature phase (Q) samples. The signal memory 108 stores the I and Q samples for a selected reception time period as a stored signal representation for later use by the correlation machine 112.

The GPS receiver 100 also includes an AB timer 124. The AB timer 124 starts at the beginning of the reception time period for generating an AB time segment signal for organizing the reception time period into alternating 10 ms "A" time segments and 10 ms "B" time segments as illustrated in FIG. 3 and described in the accompanying detailed description below. The correlation machine 112 uses the AB time segment signal for processing the stored signal samples in the signal memory 108 in series or parallel, time segment by time segment.

The correlation machine 112 integrates a signal representation of the GPS signal during each of the "A" time segments for providing a set of "A" segment magnitudes corresponding to incremental code phases, respectively, for each "A" time segment and integrates the stored signal representation of the GPS signal during each of the "B" time segments for providing a set of "B" segment magnitudes corresponding to the incremental code phases, respectively, for each "B" time segment. Preferably, the correlation machine 112 includes a replica generator for generating in-phase (I) and quadrature phase (Q) GPS replica signals for the carrier frequency and the spreading code of expected GPS signals. For each time segment, the correlation machine 112 uses either time domain or frequency domain techniques or a combination of time and frequency domain techniques for providing a correlation of the I and Q replica signals with I and Q samples of the stored signal representation for providing I and Q correlation levels. The I and Q correlation levels are accumulated for each increment code phase between the replica signals and the stored signal representation for providing I and Q integration levels. The I and Q integrations levels for each time segment are squared and then the squares are added for converting to "A" and "B" segment magnitudes. For code phase increment of slightly less than one-half chip of the C/A GPS spreading code of 1023 chips, there are 2048 "A" segment magnitudes for each "A" time segment and 2048 "B" segment magnitudes for each "B" segment magnitude.

As described above the I and Q integration levels for each time segment are preferably linear functions of the correlation level of the GPS signal, whereas the "A" and "B" segment magnitudes are preferably proportional to the sum of the squares the I and Q integration levels ($I^2+Q^2$). However, it should be noted that the "A" and "B" segment magnitudes can be other convenient non-decreasing functions of the "A" and "B" I and Q integration levels, such as the square root of the sum of the squares ($\sqrt{(I^2+Q^2)}$), or the absolute values (|I|+|Q|).

The microprocessor 114 reads programmed instructions in the program memory 116 for controlling the elements of the GPS receiver 100. The program memory 116 preferably includes an "A" combiner 134, a "B" combiner 136, an AB combiner 138, an acquisition detector 144, and a signal and navigation program 146. In an alternative embodiment one or more of the elements of program memory 116 may be incorporated into the correlation machine 112. In another alternative embodiment some or all of the functions of the correlation machine 112 may be preformed by the microprocessor 114 under instructions stored in the program memory 116.

For each potential code phase the "A" combiner 134 combines the "A" segment magnitudes incoherently for providing an "A" combined magnitude for that code phase. Similarly, the "B" combiner 136 for each potential code phase combines the "B" segment magnitudes incoherently for providing a "B" combined magnitude for that code phase. In a preferred embodiment, where the "A" segment magnitudes are ($I^2+Q^2$) the "A" combined are the sum of the squares of the I and Q integration levels ($I_1^2+I_2^2+\ldots+I_N^2+Q_1^2+Q_2^2+\ldots+Q_N^2$). Likewise for the "B" combined magnitudes. In alternative embodiments the "A" and "B" combined magnitudes can be other non-decreasing functions of the "A" and "B" segment magnitudes, respectively. For example, the "A" combined magnitude can be the square root of the sum of the squares of the "A" segment magnitudes or the sum of the "A" segment magnitudes.

The AB combiner 138 combines the "A" combined magnitude with the "B" combined magnitude for each potential code phase for providing an AB combined magnitude. In a preferred embodiment, where the "A" and "B" combined magnitudes are squared functions of the I and Q integration levels as described above, the AB combiner 138 sums the "A" combined magnitude and the "B" combined magnitude for each potential code phase for providing the AB combined magnitudes.

For an exemplary case, for a reception time period of 3 seconds, there will be 150 of the 10 ms "A" time segments and 150 of the 10 ms "B" time segments. The processing gain from the "A" time segments (or the "B" time segments) includes a factor of 10 for the coherent integration of 10 ms with respect to 1 ms and a factor of $\sqrt{150}$ for the incoherent combination of 150 of the 10 ms time periods for total processing gain of a factor of about $10*\sqrt{150}$ or $10 \log_{10}(10*\sqrt{150})$ for about 20.9 decibels (dB).

FIG. 3 illustrates the alternating A and B time segments for a reception time period with respect to an exemplary sequence of GPS data bits. Each of the "A" time segments and each of the "B" time segments is a time period of one-half the time period for a data bit. An unknown time offset separates the start of the first "A" time segment and one of the data bit transitions. Nevertheless, either the "A" time segments or the "B" time segments avoid transitions of polarity in the data bits. For the case of GPS, the data bits have a time period of 20 ms; and preferably the "A" and "B" time segments have periods of 10 ms and the first "B" time segment starts 10 ms after the start of the first "A" time segments.

Using time segments of one-half the data bit time period ensures that either the "A" time segments or the "B" time segments avoid data bit transitions, thereby ensuring that at least one of the "A" and "B" combined magnitudes results in processing gain. In the exemplary case of FIG. 3, the "A" time segments avoid the data bit transitions. Assuming the PRN code and carrier frequency are appropriate to the incoming signal and the incoming signal has sufficient strength, one of the "A" combined magnitudes will be the strongest and will exceed the correlation threshold. The strongest "A" combined magnitude is the one that results from matching the code phase for the spreading code of the incoming signal. However, some additional processing gain is usually obtained by combining the "A" and "B" combined magnitudes because the "A" or "B" time segments that overlay the data bit transitions usually lie more on one side than the other of the transition. Again referring to the illustration of FIG. 3, the "B" time segments are approximately 80% on one side of the transition and 20% on the other side. Assuming the 20% on one side of a transition nullifies a portion of the 80% on the other side, the "B" time segments are still 60% efficient.

FIG. 4 illustrates the manner in which the "A" segment magnitude sets are combined according to code phase increment for providing an "A" combined magnitude set having an "A" combined magnitude for each incremental code phase. The first "A" segment magnitude set is determined for the first "A" time segment, the second "A" segment magnitude set is determined for the second "A" time segment, the third "A" segment magnitude set is determined for the third "A" time segment, and so on until the last or Nth "A" segment magnitude set is determined for the Nth "A" time segment. In a preferred embodiment, the "A" segment magnitudes, denoted as $M_{A1-N}^2(\phi_{1-m})$, in the "A" segment magnitude sets are the sums of squares of the I and Q integration levels ($I^2+Q^2$); and the "A" combined magnitudes, denoted as $M_{AC}^2(\phi_{1-m})$, in the "A" combined magnitude set are sums of the "A" segment magnitudes $M_{A1-N}^2(\phi_{1-m})$. The "B" segment magnitude sets and the "B" combined magnitude set are combined in an identical manner.

The first "A" segment magnitude set includes an "A" segment magnitude for the first code phase increment $M_{A1}^2(\phi_1)$, an "A" segment magnitude for the second code phase increment $M_{A1}^2(\phi_1)$, an "A" segment magnitude for the third code phase increment $M_{A1}^2(\phi_3)$, and so on to an "A" segment magnitude for the mth code phase increment $M_{A1}^2(\phi_m)$. The second "A" segment magnitude set includes an "A" segment magnitude for the first code phase increment $M_{A2}^2(\phi_1)$, an "A" segment magnitude for the second code phase increment $M_{A2}^2(\phi_2)$, an "A" segment magnitude for the third code phase increment $M_{A2}^2(\phi_3)$, and so on to an "A" segment magnitude for the mth code phase increment $M_{A2}^2(\phi_m)$. The third "A" segment magnitude set includes an "A" segment magnitude for the first code phase increment $M_{A3}^2(\phi_1)$, an "A" segment magnitude for the second code phase increment $M_{A3}^2(\phi_2)$, an "A" segment magnitude for the third code phase increment $M_{A3}^2(\phi_3)$, and so on to an "A" segment magnitude for the mth code phase increment $M_{A3}^2(\phi_m)$. This continues until the last or Nth "A" segment magnitude set includes an "A" segment magnitude for the first code phase increment $M_{A3}^2(\phi_1)$, an "A" segment magnitude for the second code phase increment $M_{A3}^2(\phi_2)$, an "A" segment magnitude for the third code phase increment $M_{A3}^2(\phi_3)$, and so on to an "A" segment magnitude for the mth code phase increment $M_{A3}^2(\phi m)$.

The "A" combined magnitude set includes "A" combined magnitudes for each of the code phases. The "A" combined magnitude for the first code phase $M_{AC}^2(\phi_1)$ is the sum of the "A" segment magnitudes in each of the "A" segment magnitude sets for the first code phase. The "A" combined magnitude for the second code phase $M_{AC}^2(\phi_2)$ is the sum of the "A" segment magnitudes in each of the "A" segment magnitude sets for the second code phase. The "A" combined magnitude for the third code phase $M_{AC}^2(\phi_3)$ is the sum of the "A" segment magnitudes in each of the "A" segment magnitude sets for the third code phase. The "A" combined magnitudes are sum of the "A" segment magnitudes for each code phase until the "A" combined magnitude for the 2048th code phase $M_{AC}^2(\phi_m)$ is the sum of the squares of the "A" segment magnitudes in each of the "A" segment magnitude sets for the mth code phase.

The "B" combined magnitude set $M_{BC}^2(\phi_1)$, $M_{BC}^2(\phi_2)$, $M_{BC}^2(\phi_3)$ through $M_{BC}^2(\phi_m)$ is determined in an identical manner for the first, second, third through mth code phase, respectively. The "A" and "B" combined magnitude sets may be combined in the manner $M_{AC}^2(\phi_1)+M_{BC}^2(\phi_1)=M_{ABC}^2(\phi_1)$, $M_{AC}^2(\phi_2)+M_{BC}^2(\phi_2)=M_{ABC}^2(\phi_2)$, $M_{AC}^2(\phi_3)+M_{BC}^2(\phi_3)=M_{ABC}^2(\phi_3)$ through $M_{AC}^2(\phi_m)+M_{BC}^2(\phi_m)=M_{ABC}^2(\phi_m)$ where the $M_{ABC}^2(\phi_1)$ is the AB combined magnitude for the first code phase, the $M_{ABC}^2(\phi_2)$ is the AB combined magnitude for the second code phase, the $M_{ABC}^2(\phi_3)$ is the AB combined magnitude for the third code phase, and the $M_{ABC}^2(\phi_1)$ is the AB combined magnitude for the mth code phase, Returning to FIG. 2 the acquisition detector 144 includes instructions for processing at least one of the "A" combined magnitudes or the "B" combined magnitudes for determining a code phase increment to use for signal acquisition. In one embodiment, the "A" combined magnitude and the "B" combined magnitude for a code phase increment are combined for providing an AB combined magnitude for that code phase increment. The acquisition detector 144 determines the strongest of the "A" or "B" combined magnitudes, or determines the strongest of the AB combined magnitudes. When the strongest of the "A", "B", or AB combined magnitudes exceeds a correlation threshold, the code phase increment that resulted in the combined magnitude is used for signal acquisition. When the strongest of the combined magnitudes does not exceed the required correlation threshold, then a different Doppler frequency, a different PRN code, a different GPS time, or the like is tried and the process is repeated; or the GPS receiver 100 may go into a standby mode to conserve power. The signal and navigation program 146 includes instructions for directing the microprocessor 114 for the signal acquisition, signal tracking, location and time fixes, and control for the functions of the GPS receiver 100.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the broadest reading of the appended claims define the true idea and scope of the invention.

What is claimed is:

1. A method for receiving an incoming signal having data bits spread by a spreading code, the method comprising:
   integrating said incoming signal in first time segments for determining first segment magnitude sets, respectively, having first segment magnitudes corresponding to code phases of said spreading code;
   integrating said incoming signal in second time segments alternating with said first time segments, a first one of said second time segments following a first one of said first time segments, for determining second segment magnitude sets, respectively; said second segment magnitude sets, respectively, having second segment magnitudes corresponding to said code phases, respectively; and
   in a combiner, combining said first segment magnitude sets according to said code phases for providing a first combined magnitude set having first combined magnitudes corresponding to said code phases, respectively, and combining said second segment magnitude sets according to said code phases for providing a second combined magnitude set having second combined magnitudes corresponding to said code phases, respectively.

2. The method of claim 1, further comprising:
   acquiring said incoming signal at a particular one of said code phases based upon at least one of said first combined magnitudes and said second combined magnitudes.

3. The method of claim 2, wherein:
   acquiring said incoming signal includes determining said particular phase corresponding to one of (i) a largest of said first and second combined magnitudes for said particular phase and/or (ii) a largest of a combination of said first and second combined magnitudes for said particular phase.

4. The method of claim 1, further comprising:
   segmenting data bit time lengths into said first time segments and said second time segments.

5. A receiver for receiving an incoming spread spectrum signal having data bits spread by a spreading code, comprising:
   a segment timer for segmenting a reception time period for said incoming signal into first time segments and second time segments, a first one of said second time segments following a first one of said first time segments;
   a correlation machine for integrating said incoming signal for said first time segments for determining first segment magnitude sets, respectively, and for said second time segments alternating with said first time segments for determining second segment magnitude sets, respectively; said first segment magnitude sets having first segment magnitudes corresponding to code phases of said spreading code, respectively, and said second segment magnitude sets having second segment magnitudes corresponding to said code phases, respectively;
   a first combiner for combining said first segment magnitude sets according to said code phases for providing a first combined magnitude set having first combined magnitudes corresponding to said code phases, respectively; and
   a second combiner for combining said second segment magnitude sets according to said code phases for providing a second combined magnitude set having second combined magnitudes corresponding to said code phases, respectively.

6. The receiver of claim 5, further comprising:
   an acquisition detector for using at least one of said first combined magnitudes and said second combined magnitudes for determining a particular one of said code phases for acquiring said incoming signal.

7. The receiver of claim 6, wherein:
   the acquisition detector is further for determining said particular phase corresponding to one of (i) a largest of said first and second combined magnitudes for said particular phase and/or (ii) a largest of a combination of said first and second combined magnitudes for said particular phase.

8. The receiver of claim 5, further comprising:
   a segment timer for segmenting data bit time lengths into said first time segments and said second time segments.

9. A tangible readable medium containing a set of instructions stored in the tangible readable medium for causing a processor to carry out the following steps:
   integrating an incoming signal having data bits spread by a spreading code in first time segments for determining first segment magnitude sets, respectively, having first segment magnitudes corresponding to code phases of said spreading code;
   integrating said incoming signal in second segments alternating with said first time segments, a first one of said second time segments following a first one of said first time segments, for determining second segment magnitude sets, respectively; said second segment magnitude sets, respectively, having second segment magnitudes corresponding to said code phases, respectively; and
   combining said first segment magnitude sets according to said code phases for providing a first combined magnitude set having first combined magnitudes corresponding to said code phases, respectively, and said second segment magnitude sets according to said code phases for providing a second combined magnitude set having second combined magnitudes corresponding to said code phases, respectively.

10. The medium of claim 9, further comprising instructions for:

acquiring said incoming signal at a particular one of said code phases based upon at least one of said first combined magnitudes and said second combined magnitudes.

11. The medium of claim 10, wherein said instructions include:

acquiring said incoming signal includes determining said particular phase corresponding to one of (i) a largest of said first and second combined magnitudes for said particular phase and/or (ii) a largest of a combination of said first and second combined magnitudes for said particular phase.

12. The medium of claim 9, further comprising instructions for:

segmenting data bit time lengths into said first time segments and said second time segments.

13. The method of claim 1, wherein: said incoming signal is integrated over a reception time period of at least two said data bits for providing said first and second magnitude sets.

14. The receiver of claim 5, wherein: said reception time period is at least two said data bits for providing said first and second magnitude sets.

* * * * *